United States Patent
Zhao et al.

(10) Patent No.: US 11,100,280 B2
(45) Date of Patent: *Aug. 24, 2021

(54) TEST CASE CONSOLIDATOR

(71) Applicant: Bank of America Corporation, Charlotte, NC (US)

(72) Inventors: Tim Zhao, Toronto (CA); Akshay Patel, Cary, NC (US); Indrani Mohanty, Santa Clara, CA (US)

(73) Assignee: Bank of America Corporation, Charlotte, NC (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/598,232

(22) Filed: Oct. 10, 2019

(65) Prior Publication Data
US 2020/0042589 A1    Feb. 6, 2020

Related U.S. Application Data

(63) Continuation of application No. 15/409,077, filed on Jan. 18, 2017, now Pat. No. 10,496,739.

(51) Int. Cl.
  *G06F 40/18* (2020.01)

(52) U.S. Cl.
  CPC ................... *G06F 40/18* (2020.01)

(58) Field of Classification Search
  CPC ..................................... G06F 40/18
  See application file for complete search history.

(56) References Cited

U.S. PATENT DOCUMENTS

| | | |
|---|---|---|
| 6,360,332 B1 | 3/2002 | Weinberg et al. |
| 6,775,824 B1 | 8/2004 | Osborne, II et al. |
| 6,934,934 B1 | 8/2005 | Osborne, II et al. |
| 7,000,224 B1 | 2/2006 | Osborne, II et al. |
| 7,673,179 B2 | 3/2010 | LaBanca et al. |
| 7,694,181 B2 | 4/2010 | Noller et al. |

(Continued)

OTHER PUBLICATIONS

Kutools-2, "How to Combine Multiple Workbooks to one Workbook in Excel?" Published Jan. 6, 2016, pp. 1-8.

(Continued)

*Primary Examiner* — Stephen S Hong
*Assistant Examiner* — Ahamed I Nazar
(74) *Attorney, Agent, or Firm* — Weiss & Arons LLP; Michael A. Springs, Esq.

(57) ABSTRACT

A method for consolidating DDT spreadsheets is provided. The spreadsheets may be for testing with a test executable program. Methods may store a plurality of DDT spreadsheets in a collective DDT folder. Methods may create a single collective spreadsheet. Methods may store the single collective spreadsheet in the collective DDT folder. Methods may identify a plurality of empty cells within each DDT spreadsheet. Methods may enter a filler entry into each cell determined to be empty. Methods may copy each sheet that includes at least one test executable into the single collective spreadsheet. Methods may process each test executable included in the single collective spreadsheet. Methods may place the results of each test executable in a column orthogonal to the test executable row. Methods may copy each test executable and the results of each test executable into the plurality of DDT spreadsheets from which the test executable were copied.

9 Claims, 14 Drawing Sheets

(56) References Cited

U.S. PATENT DOCUMENTS

| | | | |
|---|---|---|---|
| 8,060,483 B2 | 11/2011 | Haub et al. | |
| 8,386,419 B2 | 2/2013 | Yalamanchilli | |
| 8,621,434 B2 | 12/2013 | Campion et al. | |
| 9,021,443 B1 | 4/2015 | Lachwani et al. | |
| 9,122,460 B2 | 9/2015 | Williamson | |
| 9,262,193 B2 | 2/2016 | Hicks et al. | |
| 9,804,956 B2* | 10/2017 | Jafary | G06F 11/3684 |
| 2002/0010743 A1 | 1/2002 | Ryan et al. | |
| 2003/0055836 A1 | 3/2003 | Dubovsky | |
| 2004/0107415 A1 | 6/2004 | Melamed et al. | |
| 2005/0034058 A1* | 2/2005 | Mills | G06F 40/18 |
| | | | 715/213 |
| 2007/0022407 A1 | 1/2007 | Givoni et al. | |
| 2008/0086627 A1* | 4/2008 | Splaine | G06F 11/3688 |
| | | | 712/227 |
| 2009/0083325 A1 | 3/2009 | Belide et al. | |
| 2013/0198567 A1* | 8/2013 | Ahmed | G06F 11/263 |
| | | | 714/32 |
| 2015/0082090 A1 | 3/2015 | Holden | |
| 2015/0234734 A1* | 8/2015 | Agrawal | G06F 11/3688 |
| | | | 714/38.1 |
| 2017/0046251 A1* | 2/2017 | Jafary | G06F 11/3688 |
| 2017/0185509 A1* | 6/2017 | Arkadyev | G06F 11/3696 |

OTHER PUBLICATIONS

Kutools, "How to Fill Blank Cells with 0 or other Specific Value in Excel?" Published Mar. 10, 2016, pp. 1-11.
AbleBits—"Consolidate Worksheets Wizard for Excel 2016, 2013-2007, Merge Data from Multiple Excel Files into One," Published Mar. 28, 2016, pp. 1-5.

* cited by examiner

| | A | B | C | D | E |
|---|---|---|---|---|---|
| 1 | Sino | Scenario ID | Test ID | Test Case Name | Business Scenario |
| 2 | 1 | Scenario_1 | 0001 | RPI_MT202_COV_AdminPay_IFW_Validation_SenderReference_SW20_Numeric_Pos19 | Positive |
| 3 | 2 | Scenario_1 | 0002 | RPI_MT202_COV_AdminPay_IFW_Validation_SenderReference_SW20_AlphaNum_SpiChars_Pos20 | Positive |
| 4 | 3 | Scenario_1 | 0003 | RPI_MT202_COV_AdminPay_IFW_Validation_SenderReference_SW13C_SingleOccurence_Pos21 | Positive |
| 5 | 4 | Scenario_1 | 0004 | RPI_MT202_COV_AdminPay_IFW_Validation_SenderReference_SW13C_DoubleOccurence_Pos22 | Positive |
| 6 | 5 | Scenario_1 | 0005 | RPI_MT202_COV_AdminPay_IFW_Validation_SenderReference_SW13C_MultipleOccurence_Pos23 | Positive |
| 7 | 6 | Scenario_1 | 0006 | RPI_MT202_COV_AdminPay_IFW_Validation_RelatedReference_SW21_Pos24 | Positive |
| 8 | 7 | Scenario_1 | 0007 | RPI_MT202_COV_AdminPay_IFW_Validation_RelatedReference_SW21_AlphaNum_SpiChars_Pos25 | Positive |
| 9 | 8 | Scenario_1 | 0008 | RPI_MT202_COV_AdminPay_IFW_Validation_ValueDate_SW30_Pos26 | Positive |
| 10 | 9 | Scenario_1 | 0009 | RPI_MT202_COV_AdminPay_IFW_Validation_ValueDate_SW30_Pos27 | Positive |
| 11 | 10 | Scenario_1 | 0010 | RPI_MT202_COV_AdminPay_IFW_Validation_ValueDate_SW32_Currency_Pos28 | Positive |
| 12 | 11 | Scenario_1 | 0011 | RPI_MT202_COV_AdminPay_IFW_Validation_SW32_Amount_Pos29 | Positive |
| 13 | 12 | Scenario_1 | 0012 | RPI_MT202_COV_AdminPay_IFW_Validation_SW32_Amount_Neodecimals_Pos30 | Positive |
| 14 | 13 | Scenario_1 | 0013 | RPI_MT202_COV_AdminPay_IFW_Validation_SW52A_Pos31 | Positive |

FIG. 1A

| | A | B | C | D | E |
|---|---|---|---|---|---|
| 1 | Sino | Scenario ID | Test ID | Test Case Name | Business Scenario |
| 2 | 1 | Scenario_1 | 0001 | RPI_MT202 COV_AdminPay_IFW Header_Validation_Sourcename_Pos01 | Positive |
| 3 | 2 | Scenario_1 | 0002 | RPI_MT202 COV_AdminPay_IFW Header_Validation_Identifier_Pos02 | Positive |
| 4 | 3 | Scenario_1 | 0003 | RPI_MT202 COV_AdminPay_IFW Header_Validation_eventPriority_XX_Pos03 | Positive |
| 5 | 4 | Scenario_1 | 0004 | RPI_MT202 COV_AdminPay_IFW Header_Validation_eventPriority_OO_Pos04 | Positive |
| 6 | 5 | Scenario_1 | 0005 | RPI_MT202 COV_AdminPay_IFW Header_Validation_eventPriority_PP_Pos05 | Positive |
| 7 | 6 | Scenario_1 | 0006 | RPI_MT202 COV_AdminPay_IFW Header_Validation_eventPriority_Misc_Pos06 | Positive |

FIG. 2A

| | F | G | H | I | J | K |
|---|---|---|---|---|---|---|
| | Transaction Name | BaseMessage | Cons umer | Transaction Status | Provider | Event |
| | AdministerInPayment | G2G_MT202COV_INPUT_WithAll_ID_Tag.EXEC | GBS | Success | GBS | TransformedCanor |
| | AdministerInPayment | G2G_MT202COV_INPUT_WithAll_ID_Tag.EXEC | GBS | Success | GBS | TransformedCanor |
| | AdministerInPayment | G2G_MT202COV_INPUT_WithAll_ID_Tag.EXEC | GBS | Success | GBS | TransformedCanor |
| | AdministerInPayment | G2G_MT202COV_INPUT_WithAll_ID_Tag.EXEC | GBS | Success | GBS | TransformedCanor |
| | AdministerInPayment | G2G_MT202COV_INPUT_WithAll_ID_Tag.EXEC | GBS | Success | GBS | TransformedCanor |

MergedFile [Compatibility Mode] - Excel

| | | | | | | |
|---|---|---|---|---|---|---|
| A | B | C | D | E | F | G |
| AdminPay_DDT_POS&NEG_V2.0.xls | | | | | | |
| Original_Sheet | | Original_Row | Sino | Scenario_ID | Test_ID | Test_Name |
| AIP_MT103_Pos23B,23E,26T,13C | | 1 | 1 | Scenario_1 | 451177 | RPI_MT103_AdminPay_SW23B_Bank Operation Code |
| AIP_MT103_Pos23B,23E,26T,13C | | 2 | 1 | Scenario_1 | 451182 | RPI_MT103_AdminPay_SW23E_Instruction Code |
| AIP_MT103_Pos23B,23E,26T,13C | | 3 | 2 | Scenario_1 | 451189 | RPI_MT103_AdminPay_SW26T_Transferring Type Cod |
| AIP_MT103_Pos23B,23E,26T,13C | | 4 | 3 | Scenario_1 | 451201 | RPI_MT103_AdminPay_SW13C_Time Indication |
| AIP_MT103_Pos32A | | 1 | 1 | Scenario_1 | 451241 | RPI_MT103_AdminPay_SW32_theCurrencyAmount_W |
| AIP_MT103_Pos33B | | 1 | 1 | Scenario_1 | 451250 | RPI_MT103_AdminPay_SW33B_theCurrencyCode |
| AIP_MT103_Pos33B | | 2 | 1 | Scenario_1 | 451254 | RPI_MT103_AdminPay_SW33B_theCurrencyAmount_W |
| AIP_MT103_Pos50A | | 1 | 1 | Scenario_1 | 451287 | RPI_MT103_AdminPay_SW50A_Orderinc Customer_A |
| AIP_MT103_Pos50A | | 2 | 2 | Scenario_1 | 451291 | RPI_MT103_AdminPay_SW50A_Ordering Customer_Id |
| AIP_MT103_Pos50F | | 1 | 1 | Scenario_1 | 451292 | RPI_MT103_AdminPay_SW50F_Ordering Customer_F |
| AIP_MT103_Pos50F | | 2 | 2 | Scenario_1 | 451296 | RPI_MT103_AdminPay_SW50F_Ordering Customer_F |
| AIP_MT103_Pos50K | | 1 | 1 | Scenario_1 | 451333 | RPI_MT103_AdminPay_SW50K_Ordering Customer_F |
| AIP_MT103_Pos50K | | 2 | 2 | Scenario_1 | 451369 | RPI_MT103_AdminPay_SW50K_Ordering Customer_F |
| AIP_MT103_Pos51A | | 1 | 1 | Scenario_1 | 451378 | RPI_MT103_AdminPay_SW51A_Sending Institution_Id |
| AIP_MT103_Pos51A | | 2 | 2 | Scenario_1 | 451382 | RPI_MT103_AdminPay_Tag70_Remittance Information |
| AIP_MT103_Pos70 | | 1 | 1 | Scenario_1 | 451402 | RPI_MT103_AdminPay_71A_chargeBearerType_SHA |
| AIP_MT103_Pos71A | | 1 | 1 | Scenario_1 | 451422 | RPI_MT103_AdminPay_SW71F_theCurrencyAmount_w |
| AIP_MT103_Pos71F | | 1 | 2 | Scenario_1 | 451436 | RPI_MT103_AdminPay_SW71F_theCurrencyAmount_w |
| AIP_MT103_Pos71F | | 2 | 1 | Scenario_1 | 451463 | RPI_MT103_AdminPay_SW71G_theCurrencyAmount |
| AIP_MT103_Pos71G | | 1 | 1 | Scenario_1 | 451478 | RPI_MT103_AdminPay_SW71G_theCurrencyAmount |
| AIP_MT103_Pos71G | | 2 | 2 | Scenario_1 | 451474 | RPI_MT103_AdminPay_SW72_Sender to receiver Infor |
| AIP_MT103_Pos72 | | 1 | 1 | Scenario_1 | 451503 | RPI_MT103_AdminPay_SW72_Sender to receiver Infor |

FIG. 5B

| | P | Q | R | S | MergedFile |
|---|---|---|---|---|---|
| 1 | Input:SW32A_LINE_2 | Input:SW20 | Output:SW20 | DDTFullPath | |
| 2 | USD1510,01 | GBSP00001 | GBSP00001 | CRP\TestDev\TestCode\Services\MW_Rationalization\DataSource\MergedFieIndy_x |
| 3 | USD1510,01 | 620917GBSP00001 | N/A | CRP\TestDev\TestCode\Services\MW_Rationalization\DataSource\MergedFieIndy_x |
| 4 | USD1510,02 | 620917GBSP00002 | N/A | CRP\TestDev\TestCode\Services\MW_Rationalization\DataSource\MergedFieIndy_x |
| 5 | USD1510,03 | 620917GBSP00003 | N/A | CRP\TestDev\TestCode\Services\MW_Rationalization\DataSource\MergedFieIndy_x |
| 6 | USD1510,04 | 620917GBSP00004 | N/A | CRP\TestDev\TestCode\Services\MW_Rationalization\DataSource\MergedFieIndy_x |
| 7 | USD1510,01 | 620917GBSP00005 | N/A | CRP\TestDev\TestCode\Services\MW_Rationalization\DataSource\MergedFieIndy_x |
| 8 | USD1511,01 | 620917GBSP00006 | N/A | CRP\TestDev\TestCode\Services\MW_Rationalization\DataSource\MergedFieIndy_x |
| 9 | USD1511,02 | 620917GBSP00007 | N/A | CRP\TestDev\TestCode\Services\MW_Rationalization\DataSource\MergedFieIndy_x |
| 10 | USD1511,01 | 620917GBSP00008 | N/A | CRP\TestDev\TestCode\Services\MW_Rationalization\DataSource\MergedFieIndy_x |
| 11 | USD1511,02 | 620917GBSP00009 | N/A | CRP\TestDev\TestCode\Services\MW_Rationalization\DataSource\MergedFieIndy_x |
| 12 | USD1511,01 | 620917GBSP00010 | N/A | CRP\TestDev\TestCode\Services\MW_Rationalization\DataSource\MergedFieIndy_x |
| 13 | USD1511,02 | 620917GBSP00011 | N/A | CRP\TestDev\TestCode\Services\MW_Rationalization\DataSource\MergedFieIndy_x |
| 14 | USD1511,01 | 620917GBSP00012 | N/A | CRP\TestDev\TestCode\Services\MW_Rationalization\DataSource\MergedFieIndy_x |
| 15 | USD1511,02 | 620917GBSP00013 | N/A | CRP\TestDev\TestCode\Services\MW_Rationalization\DataSource\MergedFieIndy_x |
| 16 | USD1511,01 | 620917GBSP00014 | N/A | CRP\TestDev\TestCode\Services\MW_Rationalization\DataSource\MergedFieIndy_x |
| 17 | USD1511,02 | 620917GBSP00015 | N/A | CRP\TestDev\TestCode\Services\MW_Rationalization\DataSource\MergedFieIndy_x |
| 18 | USD1511,05 | 620917GBSP00016 | N/A | CRP\TestDev\TestCode\Services\MW_Rationalization\DataSource\MergedFieIndy_x |
| 19 | USD1513,01 | 620917GBSP00018 | N/A | CRP\TestDev\TestCode\Services\MW_Rationalization\DataSource\MergedFieIndy_x |
| 20 | USD1517,01 | 620917GBSP00020 | N/A | CRP\TestDev\TestCode\Services\MW_Rationalization\DataSource\MergedFieIndy_x |
| 21 | USD1517,02 | 620917GBSP00021 | N/A | CRP\TestDev\TestCode\Services\MW_Rationalization\DataSource\MergedFieIndy_x |
| 22 | USD1518,01 | 620917GBSP00023 | N/A | CRP\TestDev\TestCode\Services\MW_Rationalization\DataSource\MergedFieIndy_x |

FIG. 5C

| SheetName | BaseMessage | U | Input: SW23B | Input: SW23E | Input: SW26T | Input |
|---|---|---|---|---|---|---|
| MergedFile | G2G_MT103_INPUT.EXEC | INPUT_238.EXEC.txt | N/A! | N/A! | N/A | N/A! |
| MergedFile | G2G_MT103_INPUT_238.EXEC | INPUT_238.EXEC.txt | CRED | !IGNORE! | N/A | !IGNO |
| MergedFile | G2G_MT103_INPUT_238.EXEC | INPUT_238.EXEC.txt | !IGNORE! | CRED | !IGNORE! | !IGNO |
| MergedFile | G2G_MT103_INPUT_238.EXEC | INPUT_238.EXEC.txt | !IGNORE! | !IGNORE! | TBD | !IGNO |
| MergedFile | G2G_MT103_INPUT.EXEC | INPUT_238.EXEC.txt | !IGNORE! | !IGNORE! | !IGNORE! | !IGNO |
| MergedFile | G2G_MT103_INPUT.EXEC | INPUT.EXEC | N/A! | N/A! | N/A! | N/A! |
| MergedFile | G2G_MT103_INPUT.EXEC | INPUT.EXEC | N/A! | N/A! | N/A! | N/A! |
| MergedFile | G2G_MT103_INPUT.BM4.EXEC | INPUT.BM4.EXEC.txt | N/A! | N/A! | N/A! | N/A! |
| MergedFile | G2G_MT103_INPUT.BM4.EXEC | INPUT.BM4.EXEC.txt | N/A | N/A! | N/A! | N/A! |
| MergedFile | G2G_MT103_INPUT_A1.EXEC | INPUT_A1.EXEC | N/A! | N/A! | N/A! | N/A! |
| MergedFile | G2G_MT103_INPUT_A1.EXEC | INPUT_A1.EXEC | N/A! | N/A! | N/A! | N/A! |
| MergedFile | G2G_MT103_INPUT_A3.EXEC | INPUT_A3.EXEC | N/A! | N/A! | N/A! | N/A! |
| MergedFile | G2G_MT103_INPUT_A3.EXEC | INPUT_A3.EXEC | N/A! | N/A! | N/A! | N/A! |
| MergedFile | G2G_MT103_INPUT.BM1.EXEC | INPUT.BM1.EXEC.txt | N/A! | N/A! | N/A! | N/A! |
| MergedFile | G2G_MT103_INPUT.BM1.EXEC | INPUT.BM1.EXEC.txt | N/A! | N/A! | N/A! | N/A! |
| MergedFile | G2G_MT103_INPUT.EXEC | INPUT.EXEC | N/A! | N/A! | N/A! | N/A! |
| MergedFile | G2G_MT103_INPUT.EXEC | INPUT.EXEC | N/A! | N/A! | N/A! | N/A! |
| MergedFile | G2G_MT103_INPUT.BM4.EXEC | INPUT.BM4.EXEC.txt | N/A! | N/A! | N/A! | N/A! |
| MergedFile | G2G_MT103_INPUT.BM4.EXEC | INPUT.BM4.EXEC.txt | N/A! | N/A! | N/A! | N/A! |

FIG. 5D

TEST CASE CONSOLIDATOR

CROSS-REFERENCE TO RELATED APPLICATION

This application is a continuation of U.S. patent application Ser. No. 15/409,077 filed on Jan. 18, 2017 and entitled "TEST CASE CONSOLIDATOR," now U.S. Pat. No. 10,496,739, which is hereby incorporated by reference herein in its entirety.

FIELD OF TECHNOLOGY

This invention relates to consolidation. More specifically, this invention relates to consolidation of test executables.

BACKGROUND OF THE DISCLOSURE

Transactions are typically entered into spreadsheets. The spreadsheets are then transmitted to a processor. The processor may process the transactions. Processing spreadsheets may involve certain technical difficulties. One specific technical difficulty associated with processing spreadsheets may involve processing speeds. Conventionally, a processor may only be capable of processing one spreadsheet at a time. Therefore, processing multiple transactions included in multiple spreadsheets may waste time and waste human effort. Because the spreadsheets must be processed in serial by a single processor, removing a processed spreadsheet from the processor and placing a new spreadsheet into the processor may be particularly time-consuming. Therefore, it may be desirable to consolidate the spreadsheets into one spreadsheet in order to process the transactions in an aggregated manner.

SUMMARY OF THE DISCLOSURE

A method for consolidating test executables is provided. The consolidation may conserve computing resources. The conservation of computing resources may occur during processing of the test executables within a testing framework. The method may include receiving a plurality of original spreadsheets. Each original spreadsheet may include at least one sheet. Each row included in the at least one sheet may include a test executable.

The method may include determining a plurality of empty cells within each sheet. The method may include entering a filler entry into each of the plurality of cells determined to be empty.

The method may include copying each original sheet. The method may only copy a sheet that contains, in the first row of the sheet, a predetermined sequence of characters. In some embodiments, the predetermined sequence of characters may be either "test name" or "test case name".

The method may include pasting each copied sheet into a single sheet within a monolithic spreadsheet. Each row included in each pasted sheet may include a cell. The cell may include a file path of the sheet and spreadsheet from which the row was copied.

The method may include selecting a spreadsheet within the testing framework. The selected spreadsheet may be the monolithic spreadsheet. The method may include processing each test executable included in the monolithic spreadsheet. The method may include inserting the results from the processing of each test executable into a discrete cell within the row corresponding to the test executable. The cell may be located in a column designated for test executable results.

One or more rows may be included in the single sheet of the monolithic spreadsheet. The one or more rows may be separated into non-monolithic, preferably updated, spreadsheets. The separating may be based on the file path of each row. Each row may be grouped together with other rows having a like file path.

The method may include transmitting the non-monolithic, updated spreadsheets. The plurality of original spreadsheets may be received from a plurality of entities. Each non-monolithic, preferably updated, spreadsheet may be transmitted to an entity. The entity may be included in the plurality of entities. The entity may be an entity from which the rows included in the non-monolithic, updated spreadsheet originated. Each non-monolithic, updated spreadsheet may be transmitted to the entity from which it was received.

In some embodiments, the method may be compiled using Visual Basic ("VBA") or any other suitable computing language.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 1A and 1B show an illustrative spreadsheet according to certain embodiments;

FIGS. 2A and 2B show another illustrative spreadsheet according to certain embodiments;

Figure 5A:
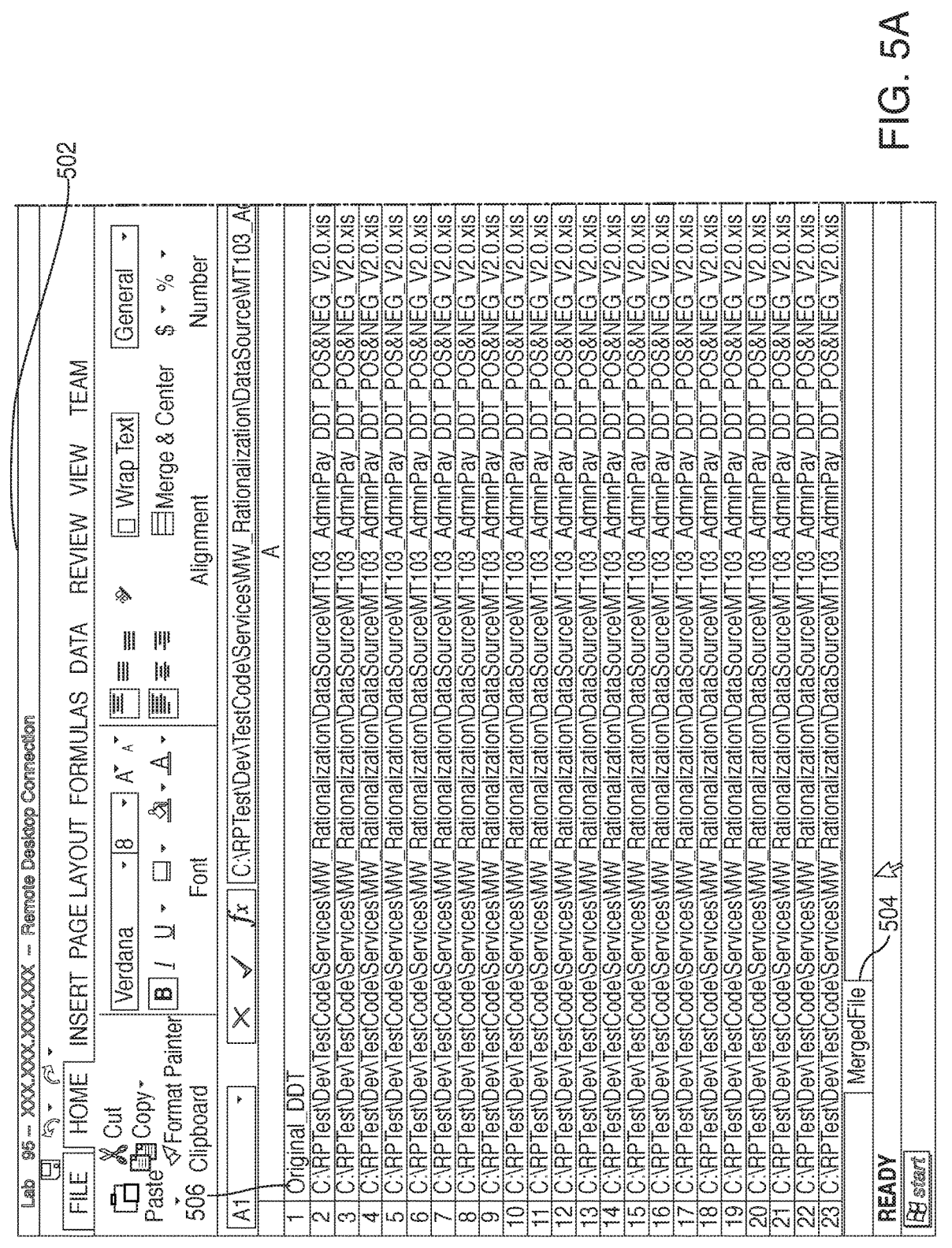

FIGS. 5A, 5B, 5C and 5D show an illustrative spreadsheet according to certain embodiments;

DETAILED DESCRIPTION OF THE DISCLOSURE

Figure 1B:
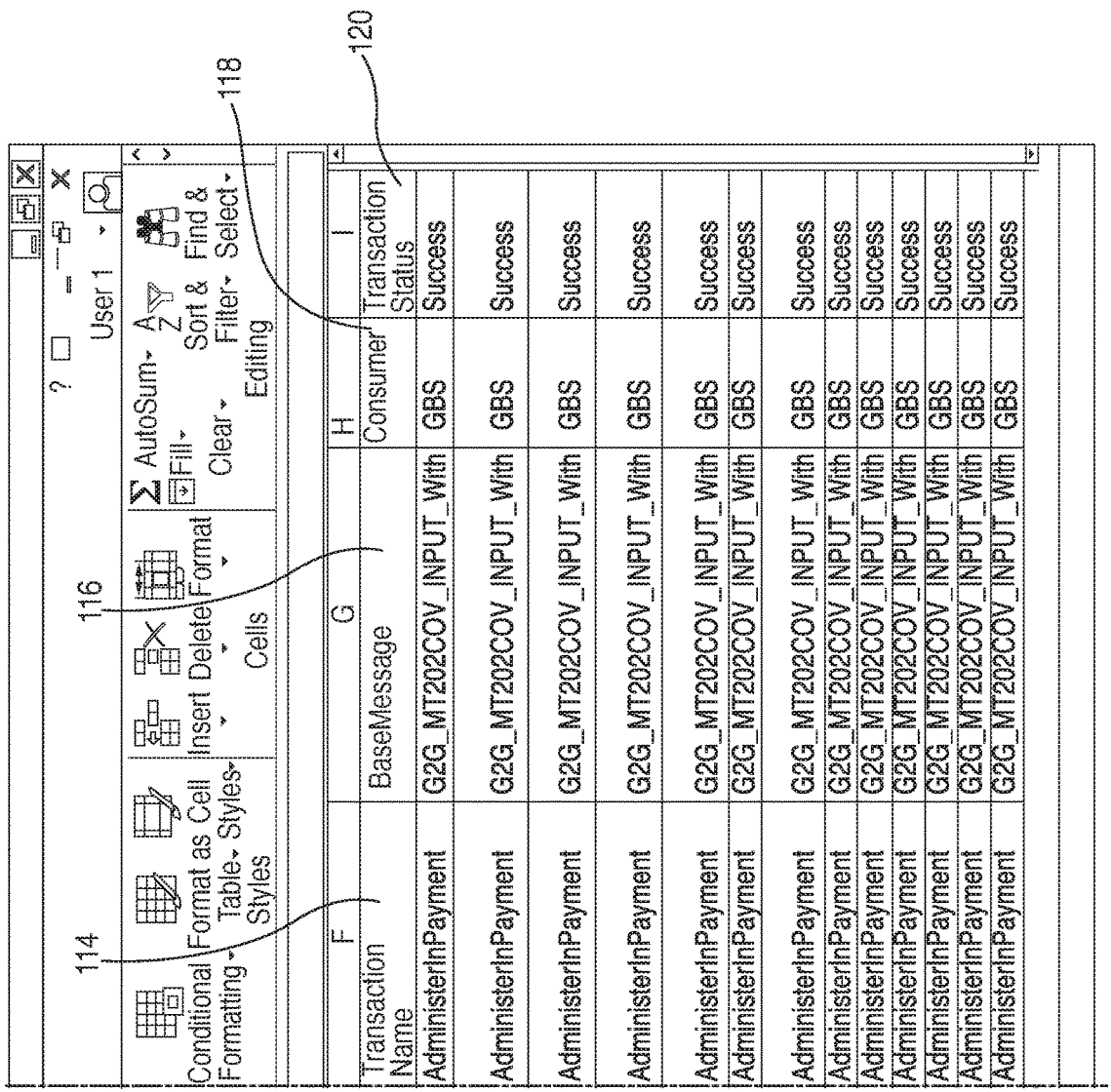

An apparatus for consolidating test executables is provided. The consolidating may be for conserving computing resources during processing of the test executables within a testing framework. The apparatus may include a receiver. The receiver may be configured to receive a plurality of spreadsheets. Each spreadsheet included in the plurality of spreadsheets may include at least one sheet. One row in a spreadsheet may be a test executable. Each row included in the at least one sheet may include a test executable.

The apparatus may include a processor. The processor may be configured to iterate through each sheet of each spreadsheet. When a sheet contains a predetermined text within at least one column header, the processor may retrieve all column headers included in the sheet. Iterating through each sheet and retrieving column headers may enable the processor to retrieve preferably every relevant permutation of each possible test executable. Each sheet may comprise a plurality of test executables. Each test executable may comprise a plurality of test specifications. Each test specification may be included in a distinct column.

Each column may include a column header. Each column header may define the contents of the test specifications included in the column. By combining all column headers, the processor may ensure that each test executable will be able to fit into the columns included in the monolithic spreadsheet. Because each test executable may not fill in each column in the monolithic spreadsheet, the processor may insert filler entries into the cells in included in a column corresponding to a testing specification that is not applicable to the specific test executable included in the row.

The processor may be configured to determine a unique set of retrieved column headers. The processor may also be configured to copy each sheet from which the column headers were retrieved. The processor may not retrieve sheets that did not include the predetermined text in the column header. This may be because some of the sheets included in the spreadsheets may not be test executable sheets. Therefore, there may be little or no motivation to copy the sheets that do not include test executables into the monolithic spreadsheet.

In some embodiments, the processor may be configured to retrieve all of the column headers. Following the retrieval of all the column headers, the processor may then remove the duplicates. In other embodiments, the processor may only retrieve the unique column headers. The processor may also be configured to copy each sheet from which the column headers were retrieved. The processor may also be configured to paste each copied sheet into a single sheet of a monolithic spreadsheet. The processor may also be configured to determine at least one empty cell within each sheet included in the plurality of spreadsheets. The processor may be configured to enter a filler entry into the at least one determined empty cell.

The processor may be configured to place a cell in each row of each pasted sheet that includes the file path and the sheet from which it was copied. The processor may also be configured to select the monolithic spreadsheet in the testing framework.

In some embodiments, the selecting may be performed by a user. The processor may be configured to process each test executable included in the single sheet within the monolithic spreadsheet. The processing may obtain a results set. The processor may be configured to insert the results from the processing each test executable into a discrete cell corresponding to the test executable. Each of the discrete cells may be located within the monolithic spreadsheet. Each discrete cell may be located in a column designated for test executable results. Each discrete cell may be located in the row corresponding to the test executable with which it is associated.

One or more rows may be included in the monolithic spreadsheet. The processor may be configured to separate the one or more rows into individual spreadsheets. The separation may be implemented based on the file path located in each row. The rows may be grouped with other rows having a like file path.

A column header may correspond to one or more testing specifications. The testing specifications may correspond to a test included in the sheet from which it was copied. The receiver may receive a plurality of spreadsheets from a plurality of entities. The apparatus may be compiled using VBA (visual basic). Examples of testing specifications may be test identification number, test case name, scenario identification number, business scenario, transaction name, base message, consumer line of business, transaction status, provider and event name.

The processor may also be configured to remove the filler entries. The processor may also be configured to remove the cells comprising the file path.

The apparatus may also include a transmitter. The transmitter may be configured to transmit the individual spreadsheets. The transmission may occur following the removal of the filler entries and following the removal of the cells comprising the file path.

The transmitter may also be configured to transmit each individual spreadsheet to the entity from which the rows included in the individual spreadsheet originated.

A method for consolidating DDT (Data Driven Testing) spreadsheets for use with a testing executable program is provided. The method may include storing a plurality of DDT spreadsheets in a collective DDT folder. The method may include creating a single collective spreadsheet. The method may also include storing the single collective spreadsheet in the collective DDT folder. The method may also include determining a plurality of empty cells within each DDT spreadsheet. The method may include entering a filler entry into each cell determined to be empty.

There may be two or more possibilities of when filler entries may be placed in spreadsheets. The timing of the placement of the filler entries may depend on the type of the original spreadsheet. When the original spreadsheet is an individual type spreadsheet—i.e., a spreadsheet that only contains columns pertaining to the test executables contained within the spreadsheet—the filler entries may not be entered until the individual spreadsheet is copied into a monolithic spreadsheet. When the original spreadsheet is a universal type spreadsheet—i.e., a spreadsheet that contains columns pertaining to all types of test executables—the filler entries may be entered into the original spreadsheet or into the monolithic spreadsheet. In this scenario, the filler entries may be entered into the original spreadsheet because each row may contain empty cells that are associated with other types of test executables.

The following exemplary table is an example of an original spreadsheet of type "individual." Test executable rows A, B and C may be included in an original spreadsheet of type "individual." See Table A.

TABLE A

| Test Executable Name | Test ID | Base Message | Business Scenario |
|---|---|---|---|
| A | 1022 | G2G_MR409 | Positive |
| B | 2099 | G3G_MR809 | Negative |
| C | 4988 | G1G_MR897 | Positive |

The following exemplary table is an example of an original spreadsheet of type "universal." Test executable rows D, E and F may be included in an original spreadsheet of type "universal." See Table B.

TABLE B

| Test Executable Name | Test ID | Base Message | Business Scenario | Transaction Name | Scenario ID | Consumer |
|---|---|---|---|---|---|---|
| D | 4566 | | | AdminPayment | 6744 | GND |
| E | 8688 | | | ACH | 9766 | CUST |
| F | 8892 | | | Check | 6200 | BAU |

Table B shows a universal spreadsheet. Columns Base Message and Business Scenario may be included in table B, even though they may be inapplicable for test executables D, E and F because table B is a universal type spreadsheet.

The following exemplary table is an example of a monolithic spreadsheet. Table C shows table A and table B combined into a monolithic spreadsheet.

TABLE C

| Test Executable Name | Test ID | Base Message | Business Scenario | Transaction Name | Scenario ID | Consumer |
|---|---|---|---|---|---|---|
| A | 1022 | G2G_MR409 | Positive | | | |
| B | 2099 | G3G_MR809 | Negative | | | |
| C | 4988 | G1G_MR897 | Positive | | | |
| D | 4566 | | | AdminPayment | 6744 | GND |
| E | 8688 | | | ACH | 9766 | CUST |
| F | 8892 | | | Check | 6200 | BAU |

It should be appreciated that filler entries may be placed in the monolithic spreadsheet. It should also be appreciated that filler entries may be placed in an original spreadsheet, prior to being transferred to a monolithic spreadsheet, in the event that the original spreadsheet is of type universal, as shown in Table B. It may be difficult to include filler entries in an original spreadsheet that is of type individual because the individual type spreadsheet may not include columns which are irrelevant to the test executables included in the individual type spreadsheet.

The method may also include entering a filler entry into each cell determined to be empty. The method may also include copying each sheet that includes at least one test executable. Each sheet may be included in a DDT spreadsheet. The copied sheets may be pasted into a single collective spreadsheet. The method may include processing each test executable included in the single collective spreadsheet. The method may include placing the results of each test executable alongside the test executable. The method may include copying the test executables and the test executable results into the plurality of DDT spreadsheets from which the test executables were copied.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIGS. 1A and 1B show illustrative spreadsheet 102. Spreadsheet 102 may include a plurality of test executables. Each test executable may include numerous test specifications. Each column may designate space for a test specification.

Spreadsheet 102 may include column 104. Column 104 may be directed to the test specification that identifies a "Sino." A Sino may include a sequence number of the relevant test executable included in the spreadsheet.

Spreadsheet 102 may include column 106. Column 106 may be directed to the test specification that identifies a scenario identification number. The scenario identification number may be a scenario associated with the test executable.

Spreadsheet 102 may also include column 108. Column 108 may be directed to the test specification that identifies a test identification number. The test identification number may be a number that identifies the relevant test. For example, row 102 identifies the test entitled "RPI_MT202 COV_AdminPay_IFW_Validation_SenderReference_SW20_N umeric_Pos19."

Spreadsheet 102 may also include column 110. Column 110 may be directed to the test specification that identifies the name of the test executable.

Spreadsheet 102 may also include column 112. Column 112 may be directed to the test specification that identifies the name of a business scenario. In some embodiments, a business scenario may be positive, negative or neutral.

Spreadsheet 102 may also include column 114. Column 114 may be directed to the test specification that identifies the name of the transaction associated with the test executable. In some embodiments, the name of the transaction may be limited to a specific subset of names that are included in a list of transaction names. A list of transaction names may include: administer in payment, debit, credit, change name, change identification number, delete, reverse previous transaction and/or any other suitable transaction name.

Spreadsheet 102 may also include column 116. Column 116 may be directed to the test specification that identifies the base message of the test executable.

Spreadsheet 102 may also include column 118. Column 118 may be directed to the test specification that identifies the consumer of the test executable. In some embodiments, the consumer may be a line of business associated with the requester of the test executable. In other embodiments, the consumer may be the name, or other identification means, of the requester of the test executable.

Spreadsheet 102 may also include column 120. Column 120 may be directed to the test specification that identifies that transaction status of the test executable. In some embodiments, the transaction status may be successful, unsuccessful or in process.

Row 122 may delineate an exemplary test executable. The Sino of the exemplary test executable may be one, as shown in column 104. The scenario identification number of the test executable may be "Scenario 1", as shown in column 106. The test identification number of the test executable may be "0001" as shown in column 108. The test case name of the test executable may be "RPI_MT202 COV_AdminPay_IFW_Validation_SenderReference_SW20_N umeric_Pos19" as shown in column 110. The business scenario of the test executable may be positive as shown in column 112. The transaction name of the test executable may be "administer in payment" as shown in column 114. The base message of the test executable may be "G2G_MT202COV_INPUT_With" as shown in column 116. The consumer of the test executable may be GBS as shown in column 118. GBS may be an acronym for global banking solutions. GBS may be an LOB (line of business). In some embodiments, the consumer of the test executable may be the recipient or beneficiary of the test executable. The transaction status of the test executable may be success, as shown in column 120.

FIGS. 2A and 2B show illustrative spreadsheet 202. Spreadsheet 202 may include a plurality of test executables. Each test executable may occupy a row of spreadsheet 202. Columns 204, 206, 208, 210, 212, 214, 216, 218 and 220 may be substantially similar to columns 104-120 in FIG. 1.

Spreadsheet 202 include column 222. Column 222 may be directed to the test specification that identifies a provider/source of the transaction associated with the test executable. The provider of the test executable may be an LOB.

Spreadsheet 202 may also include column 224. Column 224 may be directed to the test specification that identifies an event of the test executable. The event of the test executable may be a transformed canonical payment. The event of the test executable may be any other suitable event.

Spreadsheet 202 may also include tabs 228, 230, 232, 234 and 236. These tabs may indicate which sheet of the spreadsheet is open. It should be appreciated that, in a monolithic spreadsheet, there is preferably only one tab and only one sheet.

Figure 3:
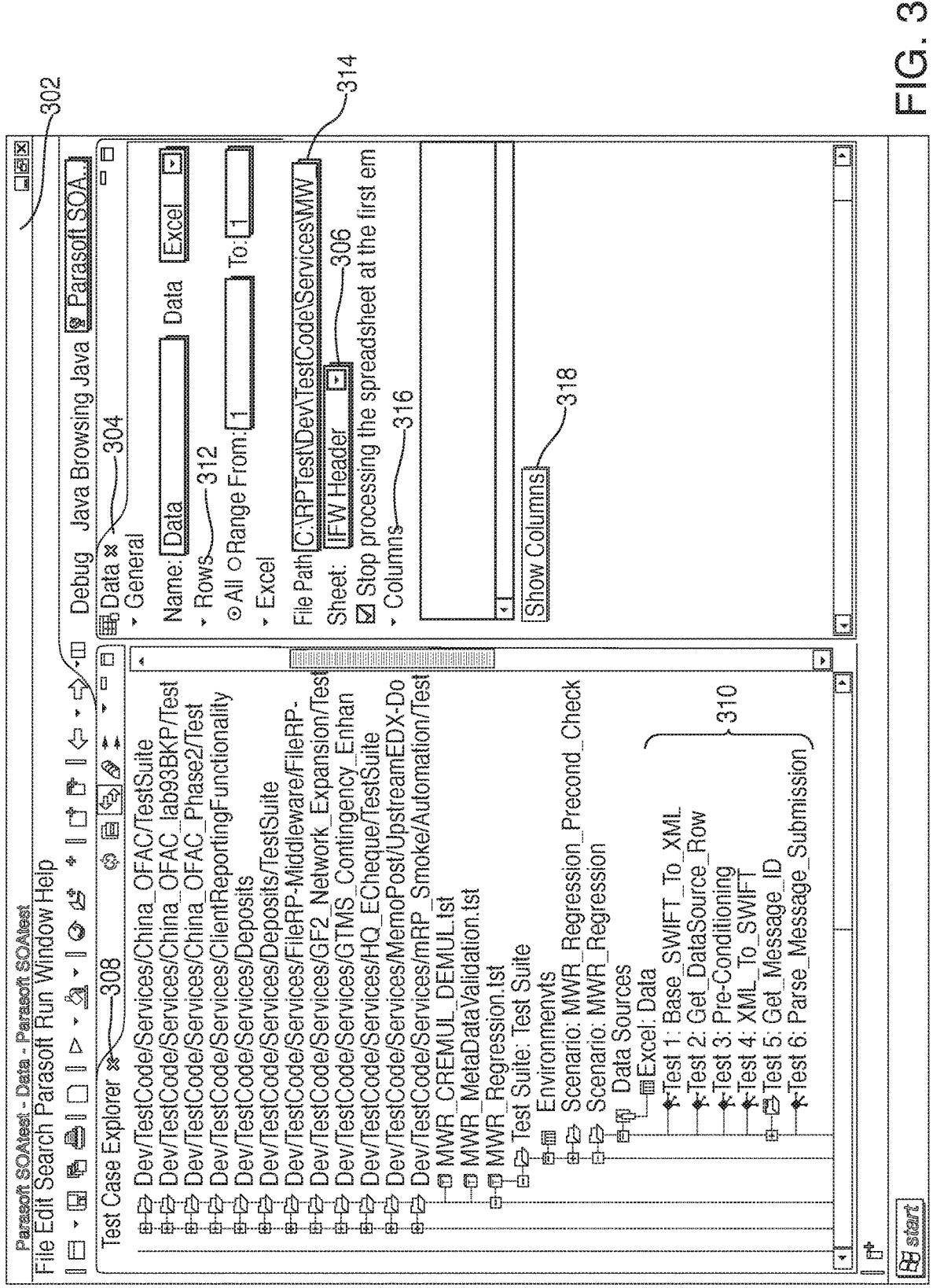
FIG. 3 shows an illustrative GUI ("Graphical user interface") according to certain embodiments.

FIG. 3 shows exemplary test executable program 302. Program 302 may enable a user to select a file. Program 302 may include data entry section 304. Data entry section 304 may enable a user to select a spreadsheet to process. Data entry section 304 may enable a user to limit the processing of the spreadsheet to specific rows or columns within the spreadsheet. As shown at 306, a user may preferably only select one sheet in the sheet selection box.

Test case explorer 308 may enable a user to view the test executables included within the selected sheet. Tests 1-6, shown at 310, may be included in the selected sheet. Rows section 312 may enable a user to choose all of the rows in the selected sheet or a range of rows (not shown). Rows section 312 may also enable a user to select multiple ranges of rows. Column section 316 may enable a user to select one or more columns. Show columns button 318 may enable a user to view the columns in the selected sheet in order to select the relevant columns.

In some embodiments, the user may select specific rows or specific columns in a spreadsheet. The test executable program may only run the tests on the selected rows and columns.

Figure 4:
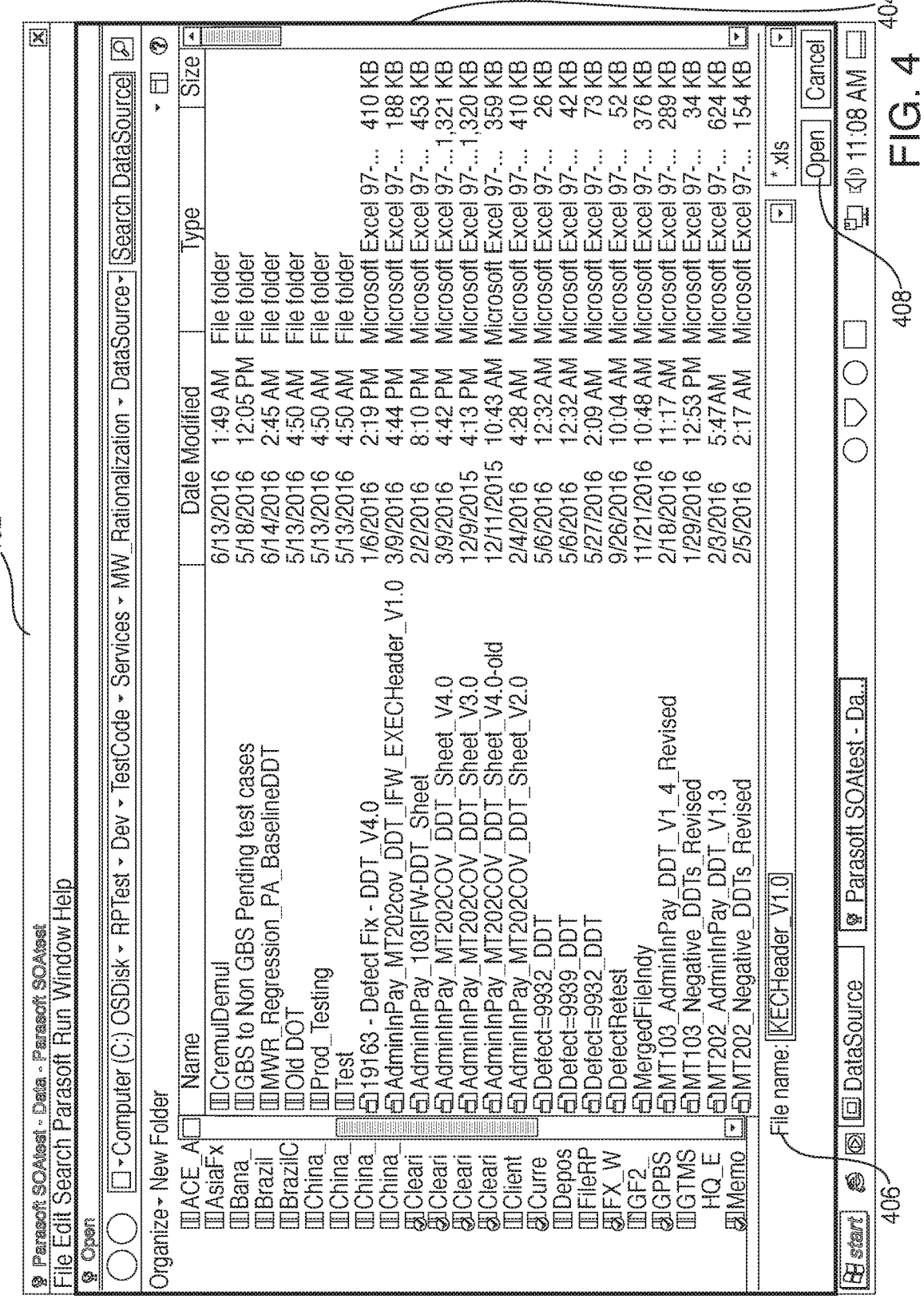
FIG. 4 shows another illustrative GUI in accordance with principles of the invention.

FIG. 4 shows screenshot 402. Screenshot 402 may show a user selecting a spreadsheet from browse window 404. The selected file name may be included in entry filed 406. A user may select open button 408 in order to open or upload the desired spreadsheet.

FIGS. 5A, 5B, 5C and 5D show exemplary merged file spreadsheet 502. Exemplary merged file spreadsheet 502 may be a monolithic spreadsheet, as described above. Spreadsheet 502 may only contain one sheet, as shown at merged file sheet 504. Merged file sheet 504 may be a compilation of a plurality of sheets included in a plurality of spreadsheets. A test executable program may have the capability to process the entirety of spreadsheet 502 in one instantiation because all of the test executables are included in one sheet.

It should be appreciated that the test executables, which have been imported from other spreadsheets, may require a mechanism, post-execution, for being returned to their original spreadsheets. Therefore, the system may include a marking system. The marking system may assign each test executable, included in the spreadsheet, an original DDT address. The original DDT address, shown at 506 of FIG. 5A, may include the original spreadsheet location of the test executable included in the cells located on the same row. The original sheet, shown at 508 of FIG. 5B, may include the original sheet location of the test executable included in the cells located on the same row. The original row, shown at 510 of FIG. 5B, may include the original row of the test executable included in the cells located on the same row.

Columns 512, 514 and 516, shown in FIG. 5B, may be substantially similar to columns 104, 106 and 108 described in connection with FIG. 1. Column 518, shown in FIG. 5B, may include a test specification that identifies the name of the test executable.

Column 520, shown in FIG. 5C, may include a test specification that identifies an amount. The amount may be an input test specification of the test executable. Column 522, shown in FIG. 5C, may also include a test specification that identifies an identification number. The identification number may be an input test specification of the test executable. Column 524, shown in FIG. 5C, may include an output of the test executable. The output information may only be visible or applicable upon the completion of the test executable program processing of spreadsheet 502. Column 526, shown in FIG. 5C may include a DDT full path of the test executable.

Column 528, shown in FIG. 5D, may include a sheet name of a monolithic spreadsheet a spreadsheet that includes one single sheet that includes a plurality of test executables which may have been combined from a plurality of spreadsheets and sheets therein. Column 530, shown in FIG. 5D, may include a test specification that identifies a base message of the test executable. Columns 532, 534, 536 and 538d, shown in FIG. 5D, may include additional input test specifications of the test executable.

Figure 6A:
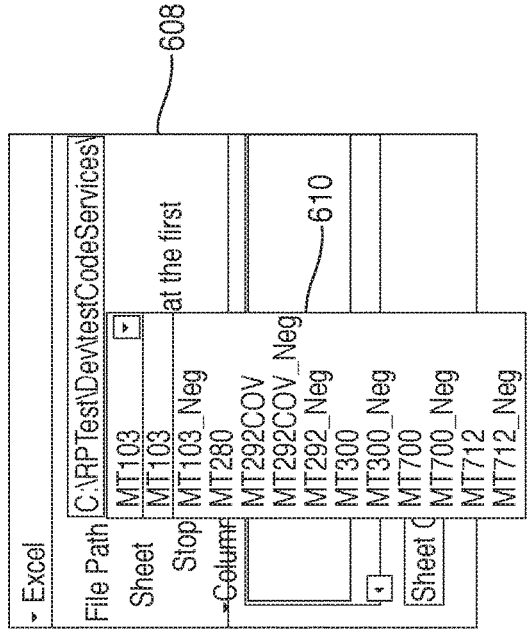
FIGS. 6A and 6B show a prior art diagram.
Figure 6B:
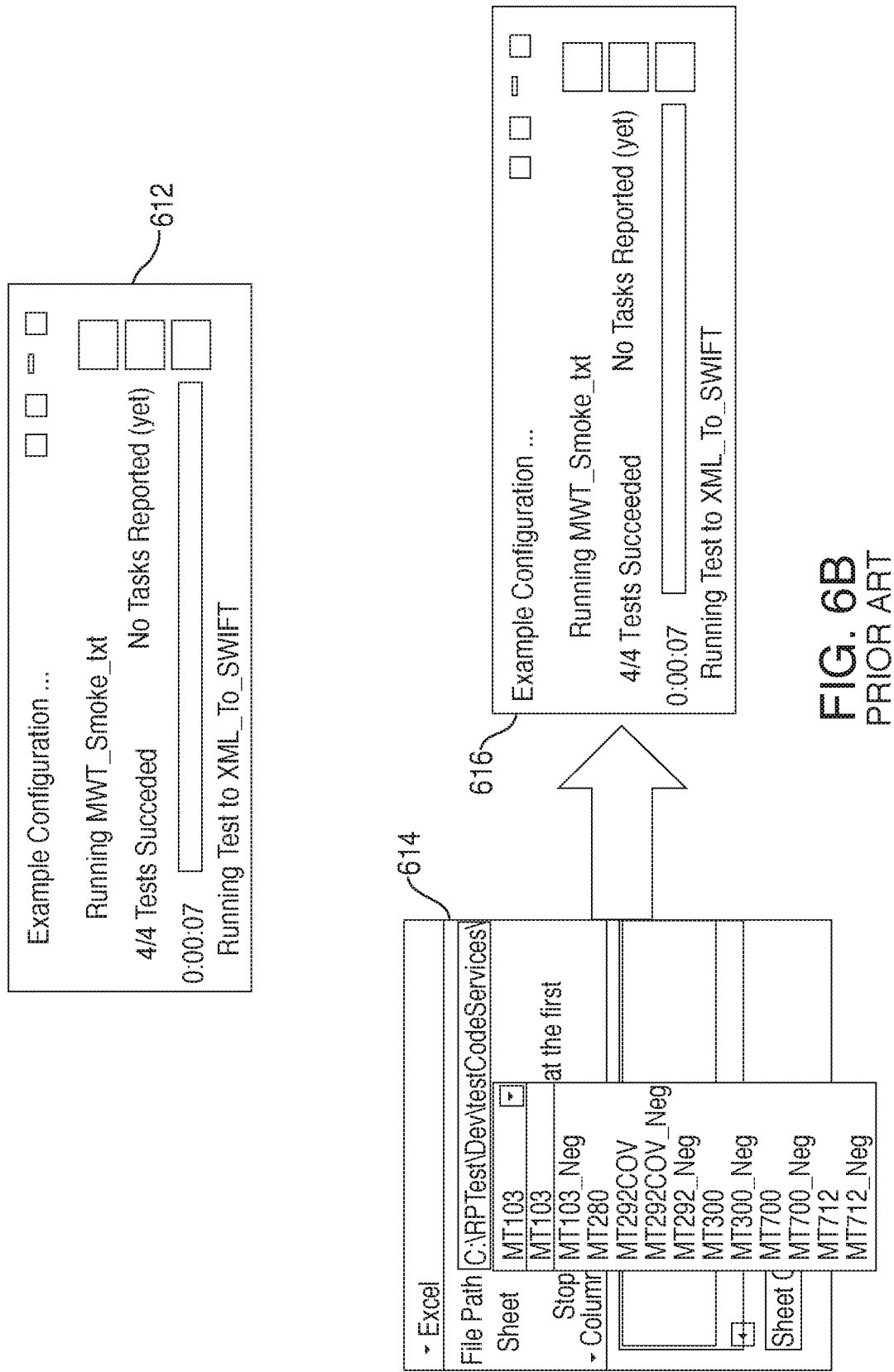

FIGS. 6A and 6B show a prior art example of running a test case execution tool. Test executables may be included in a plurality of spreadsheets and a plurality of sheets therein, shown at 602, 604 and 606 in FIG. 6A. A user may be required to process each sheet separately at test execution tool 608 in FIG. 6A. Drop down menu 610, shown in FIG. 6A, shows that only one sheet from one spreadsheet can be processed by the test execution tool. Dialog box 612, shown in FIG. 6B, shows the processing of the selected sheet. Upon completion of the execution, a user was conventionally required to manually select another sheet from the spreadsheet and repeat the process. The process repetition may be shown at selection dialog box 614 and execution dialog 616.

Figure 7A:
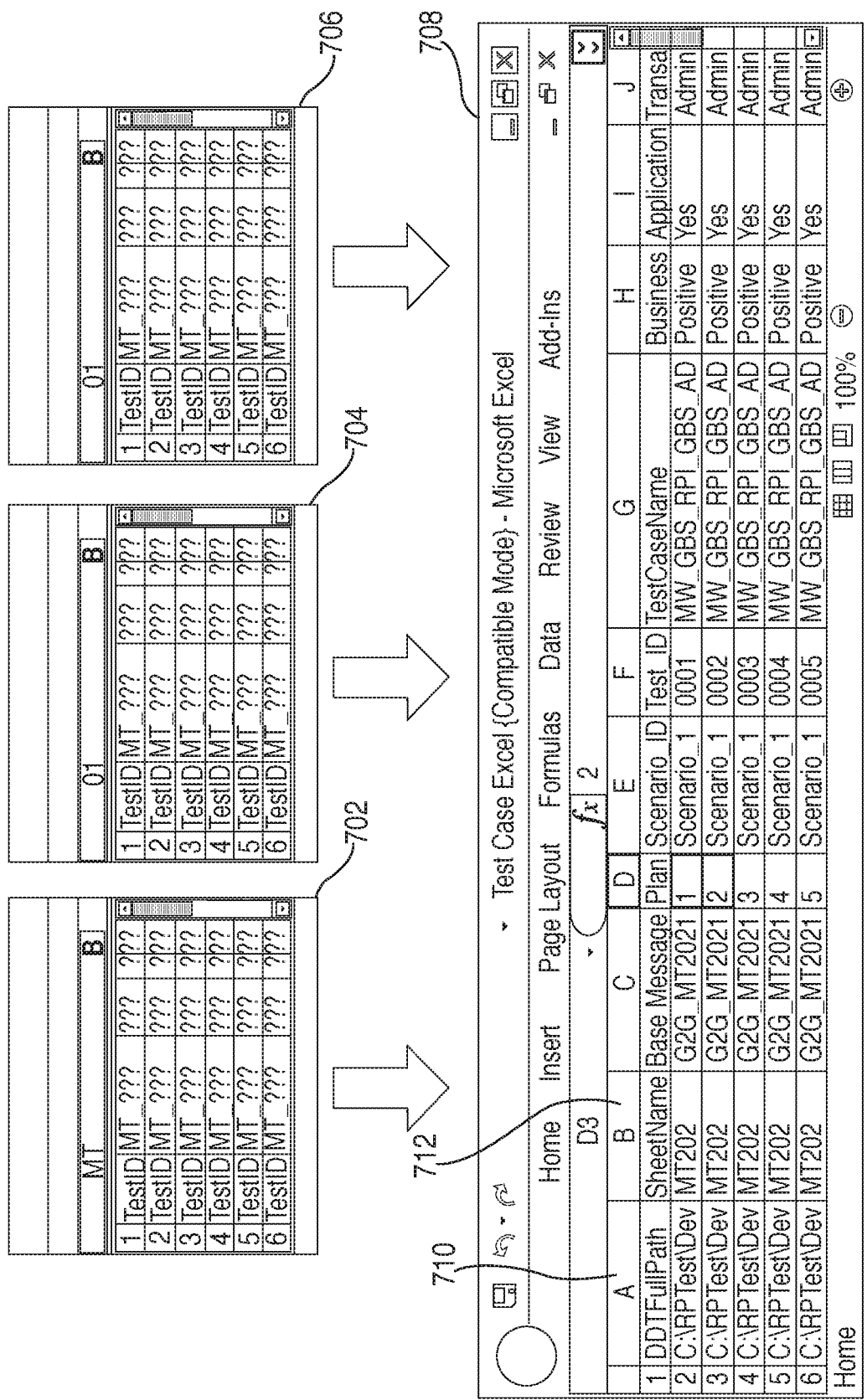
FIGS. 7A and 7B show an illustrative diagram according to certain embodiments.
Figure 7B:
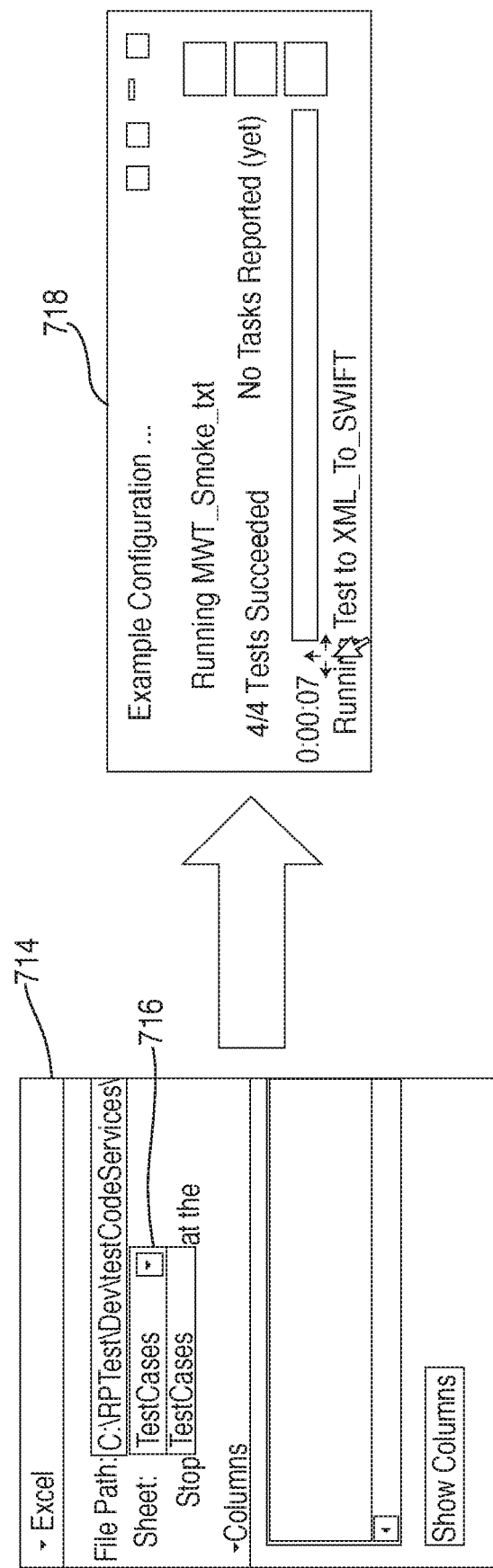

FIGS. 7A and 7B show an exemplary embodiment of a test executable consolidator according to the invention. Sheets 702, 704 and 706 may be consolidated into monolithic spreadsheet 708. In addition, the DDT full path, shown at 710, and sheet name, shown at 712, may be incorporated in spreadsheet 708. At test executable dialog box 714 only one sheet may be selectable, as shown at 716. The one sheet may be processed, as shown at dialog box 718. It should be appreciated that, upon completion of processing, monolithic spreadsheet 708 may be divided into the original sheets 702, 704 and 706. The division may be based on DDT full path 710 and sheet name 712. It should also be appreciated that prior to transmission of the post-processing original spreadsheets, DDT full path 710 and sheet name 712 may be deleted. Deleting DDT full path 710 and sheet name 712 may enable a spreadsheet transmitter to receive the processed sheets without any difference even though the sheets had been combined into a monolithic sheet.

Thus, methods and apparatus for test executable consolidation have been provided. Persons skilled in the art will appreciate that the present invention can be practiced by other than the described embodiments, which are presented for purposes of illustration rather than of limitation. The present invention is limited only by the claims that follow.

What is claimed is:

1. A method for consolidating test executables, said consolidating for conserving computing resources during processing of the test executables within a testing framework, the method comprising:
    receiving a plurality of original spreadsheets, each of the spreadsheets received from a single one of a plurality of entities, wherein each original spreadsheet included in the plurality of original spreadsheets comprises at least one sheet, wherein each row included in each at least one sheet comprises a test executable;
    copying each sheet, included in each of the plurality of original spreadsheets, that contains, in the first row of the sheet, a designated sequence of characters;
    pasting each copied sheet into a single sheet within a monolithic spreadsheet, said monolithic spreadsheet comprising only a single sheet, wherein each row included in each pasted sheet includes a cell that comprises a file path of the sheet and spreadsheet from which the row was copied;
    identifying a plurality of empty cells within the monolithic spreadsheet;
    entering a filler entry into each of the plurality of empty cells included in the monolithic spreadsheet;
    selecting, using the testing framework, the monolithic spreadsheet;
    processing each test executable included in the single sheet;
    inserting a set of results from the processing of each test executable into a discrete cell within the row corresponding to the test executable, the cell being located in a column designated for test executable results;
    separating one or more rows into groups of rows sharing a like file path, said one or more rows included in the single sheet;
    removing the filler entry from each cell that includes a filler entry;
    removing each cell that comprises the file path;
    storing each of said groups into one of a plurality of non-monolithic, updated, spreadsheets; and
    transmitting each of the non-monolithic, updated spreadsheets to an entity, said entity included in the plurality of entities from which the rows included in the non-monolithic, updated spreadsheets originated.

2. The method of claim 1, wherein each non-monolithic, updated spreadsheet is transmitted to the entity from which it was received.

3. The method of claim 1, wherein the designated sequence of characters is either "test name" or "test case name".

4. The method of claim 1, wherein the designated sequence of characters includes the word "test."

5. The method of claim 1, wherein the method is compiled using Visual Basic ("VBA").

6. An apparatus for consolidating test executables, said consolidating for conserving computing resources during processing of the test executables within a testing framework, a spreadsheet comprising one or more sheets, the apparatus comprising:
    a receiver configured to:
        receive a plurality of spreadsheets, each of the plurality of spreadsheets received from a single one of a plurality of entities, wherein each spreadsheet included in the plurality of spreadsheets comprises at least one sheet, wherein each row included in the at least one sheet comprises a test executable;
    a processor configured to:
        iterate through each sheet of each spreadsheet and, determine at least one empty cell within at least one sheet within at least one spreadsheet included in the plurality of spreadsheets;
        enter a filler entry into the at least one determined empty cell;
        iterate through each sheet of each spreadsheet and, when a sheet contains a predetermined text within at least one column header of the sheet, retrieve all column headers included in the sheet;
        construct, based on the iteration, a unique set of retrieved column headers;
        copy each sheet from which each of the column headers were retrieved;
        paste each copied sheet into a single sheet of a monolithic spreadsheet;
        place a cell in each row of each pasted sheet, the cell which includes the file path and the sheet from which it was copied;
        select the monolithic spreadsheet in the testing framework;
        process each test executable included in the single sheet within the monolithic spreadsheet, said processing to obtain a result set, said result set comprising a plurality of results;
        insert each of said results from the processing of each test executable into a discrete cell corresponding to the test executable, each of said discrete cells located within the monolithic spreadsheet, said discrete cells located in a column designated for test executable results, each of said discrete cells located in the row corresponding to the test executable;
        remove the filler entry from the at least one cell that includes a filler entry;
        remove the cell from each row that includes the file path;
        separate one or more of the rows into groups of rows, each group of rows sharing a like file path, and storing each of said groups into a plurality of individual spreadsheets, the separation being implemented based on the file path of each group;
        store each of said groups of rows into one of a plurality of non-monolithic, updated, spreadsheets; and
        transmit each of the non-monolithic, updated spreadsheets to an entity, included in the plurality of entities from which the rows included in the non-monolithic, updated spreadsheets originated.

7. The apparatus of claim 6, wherein the column header corresponds to a testing specification, said testing specification corresponding to a test included in the sheet of the spreadsheet from which it was copied.

8. The apparatus of claim 7, wherein the at least one empty cell is included in a column that is designated for a specific testing specification, said specific testing specification being unrelated to the row in which the at least one empty cell is included.

9. The apparatus of claim 6, wherein the apparatus is compiled using Visual Basic ("VBA").

\* \* \* \* \*